United States Patent [19]
Hara

[11] Patent Number: 5,369,667
[45] Date of Patent: Nov. 29, 1994

[54] APPARATUS AND METHOD FOR AUTOMATICALLY ADJUSTING PARAMETERS OF AN AUTOMATIC EQUALIZER

[75] Inventor: Masaaki Hara, Kanagawa, Japan

[73] Assignee: Sony Corporation, Tokyo, Japan

[21] Appl. No.: 956,246

[22] Filed: Oct. 5, 1992

[30] Foreign Application Priority Data

Oct. 16, 1991 [JP] Japan .................... 3-296389
Oct. 18, 1991 [JP] Japan .................... 3-299662

[51] Int. Cl.$^5$ ............................ H03H 7/40
[52] U.S. Cl. ............................ 375/12; 375/14
[58] Field of Search ............ 375/12, 14; 333/18, 333/28 R; 364/724.19, 724.2

[56] References Cited

U.S. PATENT DOCUMENTS

| | | | |
|---|---|---|---|
| 3,611,149 | 10/1971 | Kimball | 330/70 R |
| 4,343,041 | 8/1982 | Forney, Jr. | 375/15 |
| 4,608,703 | 8/1986 | Kaga et al. | 375/13 |
| 4,759,036 | 7/1988 | Meyers | 375/14 |
| 5,313,472 | 5/1994 | Hara | 371/31 |

FOREIGN PATENT DOCUMENTS 0180971  5/1986  European Pat. Off. .

OTHER PUBLICATIONS

Record of Supercomm/ICC '90 vol. 2, No. 305, 15 Apr. 1990, Atlanta, Ga., US pp. 397–403.
Electronics Letters vol. 26, No. 1, 4 Jan. 1990, Stevenage, Herts., GB pp. 13–15.

*Primary Examiner*—Stephen Chin
*Assistant Examiner*—T. Ghebretinsae
*Attorney, Agent, or Firm*—William S. Frommer; Alvin Sinderbrand

[57] ABSTRACT

It is intended to converge parameters stably in a short time upon automatic adjustment of parameters of a bit identifier by which a signal reproduced from a magnetic recording medium and equalized by the Nyquist standard is compared with a threshold value and converted into a binary signal. An estimation value H(j) of an equalization error is cleared in step 1. Such estimation values H(j) are added in step 2 without being limited in the number of occurrences of addition. A result of the addition is compared with a converging coefficient M in step 3. As long as the result of the addition does not exceed the converging coefficient M, addition is repeated. When the result of the addition reaches the predetermined value, a fixed step Δ is added to or subtracted from a parameter in response to the estimation value H(j). Therefore, parameter renewal interval is variable in response to the amount of equalization errors.

13 Claims, 8 Drawing Sheets

Fig. 3

| OCCURRENCES OF ADDITION | OCCURRENCES OF CONVERGENCE | ERROR RATE | S | D |
|---:|---:|---:|---:|---:|
| 100 | 1 | 0.001038 | 4 ~ 13 | 9 ~ 16 |
| 200 | 3 | 0.001038 | 4 ~ 11 | 10 ~ 16 |
| 400 | 3 | 0.000885 | 4 ~ 11 | 10 ~ 15 |
| 800 | 5 | 0.000977 | 6 ~ 11 | 11 ~ 15 |
| 1600 | 5 | 0.000855 | 5 ~ 10 | 12 ~ 15 |
| 3200 | 10 | 0.000931 | 6 ~ 9 | 12 ~ 15 |
| 6400 | 20 | 0.000778 | 7 ~ 9 | 12 ~ 14 |
| 12800 | 37 | 0.000824 | 8 ~ 9 | 12 ~ 13 |

Fig. 6

| OCCURRENCES OF ADDITION | OCCURRENCES OF CONVERGENCE | ERROR RATE | S | D |
|---:|---:|---:|---:|---:|
| 100 | 1 | 0.001129 | 4 ~ 13 | 9 ~ 17 |
| 200 | 2 | 0.001083 | 5 ~ 11 | 10 ~ 16 |
| 400 | 1 | 0.000930 | 4 ~ 11 | 10 ~ 15 |
| 800 | 3 | 0.001053 | 5 ~ 11 | 10 ~ 15 |
| 1600 | 2 | 0.001190 | 5 ~ 10 | 11 ~ 15 |
| 3200 | 2 | 0.001297 | 5 ~ 10 | 11 ~ 15 |
| 6400 | 4 | 0.001480 | 4 ~ 10 | 10 ~ 16 |
| 12800 | 4 | 0.001617 | 5 ~ 11 | 10 ~ 16 |

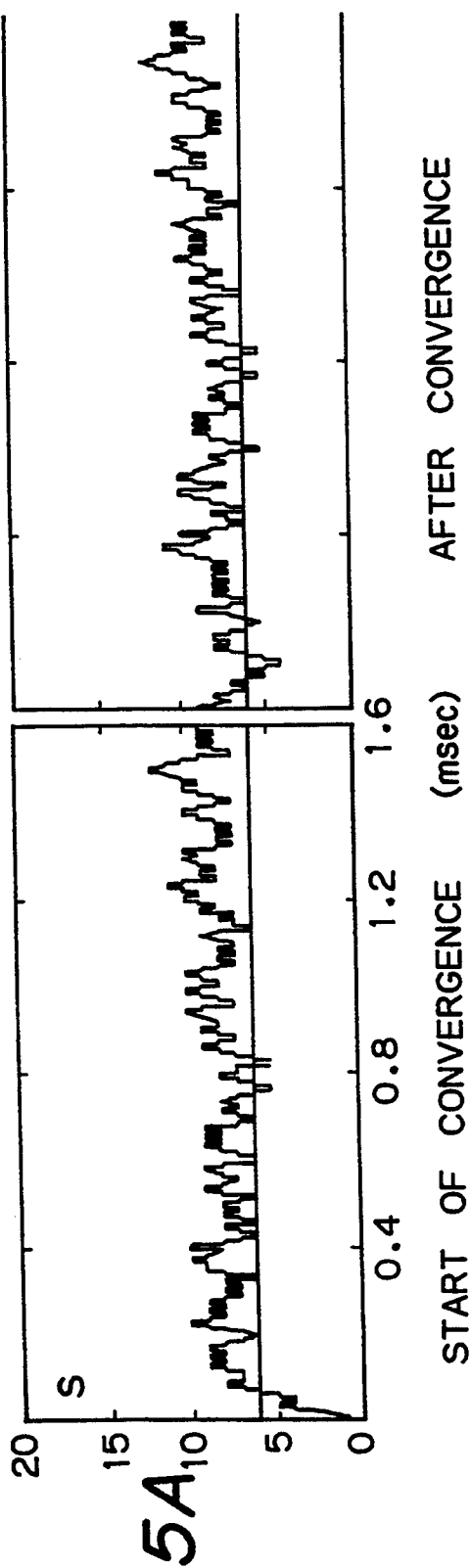
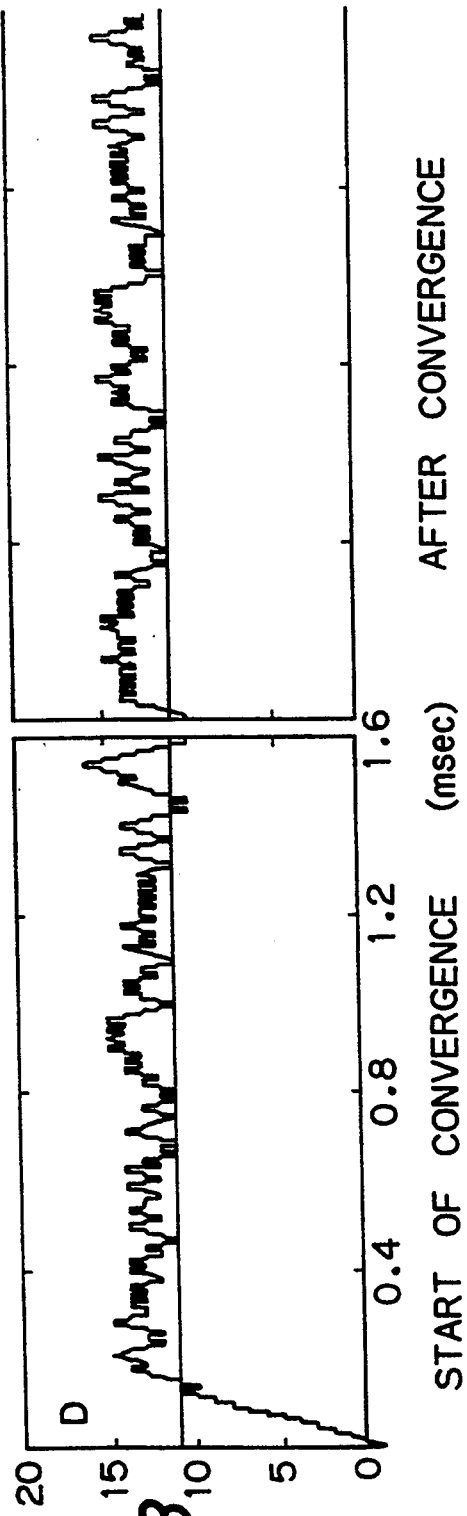

| COEFFICIENTS OF CONVERGENCE | OCCURRENCES OF CONVERGENCE | ERROR RATE | S | D |
|---|---|---|---|---|
| 4 | 1 | 0.000809 | 1 ~ 15 | 8 ~ 17 |
| 8 | 1 | 0.000961 | 4 ~ 13 | 10 ~ 16 |
| 16 | 1 | 0.000961 | 5 ~ 10 | 11 ~ 15 |
| 32 | 2 | 0.000931 | 6 ~ 10 | 12 ~ 14 |
| 64 | 3 | 0.000824 | 7 ~ 9 | 12 ~ 14 |
| 128 | 5 | 0.000839 | 7 ~ 9 | 11 ~ 13 |
| 256 | 7 | 0.000809 | 7 ~ 8 | 12 ~ 13 |
| 512 | 14 | 0.000794 | 7 ~ 8 | 11 ~ 13 |

APPARATUS AND METHOD FOR AUTOMATICALLY ADJUSTING PARAMETERS OF AN AUTOMATIC EQUALIZER

BACKGROUND OF THE INVENTION

1. Field of the Invention

This invention relates to a method for automatically adjusting characteristics of a reproducing signal processing apparatus in a digital recording and reproducing system or in a digital transmission system using a magnetic recording medium and, in particular, for automatically adjusting characteristics of an automatic equalizer for converting a reproduced signal into a digital signal.

2. Description of the Prior Art

In a digital recording and reproducing system or a digital transmission system, an increase in the recording density causes a decrease in the S/N ratio of a signal reproduced from a magnetic recording medium (magnetic tape, magnetic disk and so on), and increases such errors so that the reproduced digital signal does not correspond to the recorded digital signal. There is the need for a signal processing technique that properly detects a digital signal from an analog waveform from a reproducing head.

A known existing signal processing technique available for this purpose is an integral detecting method. This method executes equalization based on an equalizing standard, called the Nyquist standard, to minimize intersymbol interference at an identified point and then binarizes the Nyquist waveform in view of the value relative to a predetermined threshold value.

With respect to characteristics of an equalizer for equalization referred to above, parameters are fixed after being adjusted by using a test signal so as to minimize code errors. Nevertheless, code errors increase with variations or changes with time in an electromagnetic converter system including tape and heads. When a scheme that sets parameters to optimal values by using a test signal is compared with a scheme that sets parameters automatically, there are slightly more errors in the automatic setting scheme. However, automatic adjustment of parameters copes with varieties of tape and heads or their changes with time. Taking this into consideration, automatic setting of parameters can reduce the error rate in the long-range view than the longtime use of parameters manually set to minimize errors. Therefore, the equalizer is desired to be an automatic equalizer whose characteristics are adjusted automatically in accordance with a reproduced signal. There is the zero forcing algorithm as a procedure for realizing such an automatic equalizer. This procedure calculates equalization errors successively and reestablishes a tap coefficient of, for example, a transversal filter, in a direction for minimizing the errors.

Explained below is a case where the zero forcing algorithm is employed in a three-tap transversal filter. Output of the three-tap transversal filter is as follows:

$$X(k)=C(-1)\times Y(k-1)+C(0)\times Y(k)+C(1)\times Y(k+1)$$

where

Y(k): amplitude of a reproduced signal of a kth bit before equalization

X(k): amplitude of the reproduced signal of the kth bit after equalization

C(O): coefficient for a current bit

C(−1): tap coefficient for a preceding bit

C(1): tap coefficient for a subsequent bit

For automatic equalization, an equalization error and its estimation value are obtained. A signal E(k) corresponding to the equalization error is given by:

$$E(k)=(X(k)-T)-B(k)$$

where

E(k): equalization error of the kth bit

B(k): expected amplitude value obtained from a result of detection of the kth bit T: threshold value for integral detection The equalization error estimation value (estimation value of equalization error) H(j) is given by:

$$H(j)+\Sigma A(k-i)\times sgn(E(k))$$

where $\Sigma$: sum of (k=0) to (k=N)

A(k): result of identification of the kth bit (1 or −1)

$\alpha \geq 0 : sgn(\alpha)=1$ $\alpha < 0 : sgn(\alpha)=-1$

An appropriate number of occurrences of addition N for obtaining the estimation value H(j) is related to the S/N of the reproduced signal.

In the three-tap transversal filter, the coefficient of the filter is increased or decreased by an infinitesimal value $\Delta$ in a direction for reducing intersymbol interference in accordance with signs of three estimation values. That is, filter coefficients as a result of automatic equalization are:

$$C(-1)=C(-1)-\Delta \times sgn(H(-1))$$

$$C(0)=C(0)-\Delta \times sgn(H(0))$$

$$C(1)=C(1)-\Delta \times sgn(H(1))$$

This is the procedure of automatic equalization by a three-tap transversal filter using the zero forcing.

In regard to convergence of parameters (filter coefficients), it is desired that convergence occurs in a short time immediately after the start of convergence or upon changes in status in which equalization errors may often occur that variation is small after sufficient convergence, which would result in a decrease in code errors. In order to meet these requirements, a method of changing the width of an increase or decrease $\Delta$ in a nonlinear fashion in accordance with the magnitude of the estimation value of the equalization error H(j) is often used. For example, this is done as follows in accordance with, for example, the ratio between the estimation value H(j) and a convergence coefficient M (absolute value):

$$0<[H(j)/M]<1:\Delta=1$$

$$1<[H(j)/M]<2:\Delta=2$$

$$2<[H(j)/M]<4:\Delta=3$$

$$4<[H(j)/M]<8:\Delta=4$$

$$8<[H(j)/M]:\Delta=5$$

Hereinbelow, this method is called the variable step method. FIG. 4 shows this method in the form of a flow chart. In FIG. 4, reference numeral 31 denotes a clearing step for clearing k and H(j) to zero. Next, step 32 calculates estimation value H(j) of an error. Then the value of k is incremented by +1. Step 33 decides whether (k=N) or not, and calculates estimation values N times. After addition is done N times, steps of decision 34, 35, 36 and 37 are executed successively. These steps of decision 34 to 37 are those referred to above. When results of such decision are affirmative, the value Δ is set to 1, 2, 3 and 4, respectively (steps 38, 39, 40 and 41). When all of the results of the decision are negative, control moves to step 42, and the value Δ is set to 5. Then in step 43, the coefficient C(j) is increased or decreased by the width of Δ determined in accordance with the polarity of the estimation value H(j).

This method certainly realizes fast convergence in the presence of numerous equalization errors, and decreases variation after sufficient convergence. However, it requires circuits (in case of hardware) or steps (in case of software) for varying Δ in response to the value of [H(j)/M] as many as the number of parameters, and therefore increases the scale of the entire circuit or the processing time by software.

Previously, the present Applicant remarked the fact that it is possible to presume where errors may occur because of random noise, low range shut-off, high range shortage and so forth, and proposed a system for adaptively controlling a threshold value of an integral detecting scheme (U.S. Pat. No. 5,313,472 filed Jun. 4, 1992). The application shows that each parameter S and D of the system is equivalent to the filter coefficient of an automatic equalizer. Therefore, the following simulations are executed with the system instead of the automatic equalizer.

In regard to the automatic equalization employed in the adaptive threshold value detecting scheme referred to above, converging characteristics of parameters with varieties of the number of occurrences of addition N are illustrated. These are results of simulation by a computer by introducing a digital VTR reproduced signal A/D-converted in eight bits. The simulation system employs the adaptive threshold value detecting scheme after a linear equalizer, and automatically sets two parameters S and D, required for the detection, from the initial value 0 by using the zero forcing algorithm.

FIG. 1 shows a case where the number of occurrences of addition N is 100, while FIG. 2 shows a case where N=6400. Further, results of cases where N is 100 to 12800 are shown in a table of FIG. 3. In FIG. 3, each numeral in the column "occurrences of convergence" is the number of occurrences of repetition at the time when results become constant or periodic after simulating the same data repeatedly by using a parameter resulting from preceding convergence as the initial value. FIGS. 1 and 2 show values after reaching the condition as converged values.

According to the results of the simulation, although parameters converge early under N=100, variation after convergence is large, and code errors are numerous. Under N=6400, although variation after convergence is small and code errors are less, a relatively long time is required for convergence.

FIG. 5 shows an aspect of convergence of parameters S and D by the variable step method. FIG. 5 shows variation immediately before convergence and variation after convergence under (N=400 and M=32). FIG. 6 shows results of variation by changing N and fixing M to 32.

OBJECTS AND SUMMARY OF THE INVENTION

It is therefore an object of the present invention to provide a method for automatically adjusting parameters of an automatic equalizer, which can be realized in the form of a simpler circuit arrangement than that of the existing method, ensures fast convergence immediately after the start of convergence or upon changes in status in which equalization errors are numerous, and decreases the variation after sufficient convergence.

According to an aspect of the invention, there is provided a method for automatically adjusting parameters of an automatic equalizer, which equalizes a reproduced signal reproduced from a magnetic recording medium by an electromagnetic converter on the basis of the Nyquist standard, then compares the equalized reproduced signal with a threshold value, and converts the reproduced signal into a binary signal, comprising the steps of:

A. clearing an equalization error estimation value of an identification value created by the automatic equalizer;

B. adding to the equalization error estimation value already obtained the newly obtained estimation value; and C. comparing the absolute value of a result of the addition of the equalization error estimation values with a predetermined convergent coefficient, if the absolute value of the result of the addition is smaller than the convergent coefficient, returning to step B, and if the absolute value of the result of the addition is larger than the convergent coefficient, varying a parameter of the automatic equalizer in accordance with the polarity of the estimation values.

Immediately after the start of convergence or upon a change in status where equalization errors are numerous, parameters are reset in short intervals and are converged fastly. In contrast, after sufficient convergence where equalization errors are few, resetting intervals of the parameters are elongated. That is, while the step is held constant, the number of occurrences of addition N is varied with amount of equalization errors.

The above, and other, objects, features and advantage of the present invention will become readily apparent from the following detailed description thereof which is to be read in connection with the accompanying drawings.

BRIEF DESCRIPTION OF THE DRAWINGS

FIG. 3 is a schematic view showing variation of parameters in the existing automatic equalization;

FIGS. 5A and 5B are schematic views showing converging characteristics of parameters by another example of the existing automatic equalization;

FIG. 6 is a schematic view showing variation of parameters in another example of the existing automatic equalization;

DETAILED DESCRIPTION OF THE PREFERRED EMBODIMENTS

An embodiment of the invention is explained below. Outline of the processing by the present invention is as follows:

1) The step A for changing a parameter is set.
2) The converging coefficient (M) is set in response to the S/N.
3) Estimation value H(j) of an equalization error is obtained by adding the correction value $A(k-j) \times sgn(Ek)$.
4) If the absolute value thereof is larger than the converging coefficient M, A in regard to a corresponding parameter is increased or decreased in accordance with the positive or negative sign.
5) Thereafter, H(j) is cleared, and the processing is repeated from 3).

Figures 7, 10:
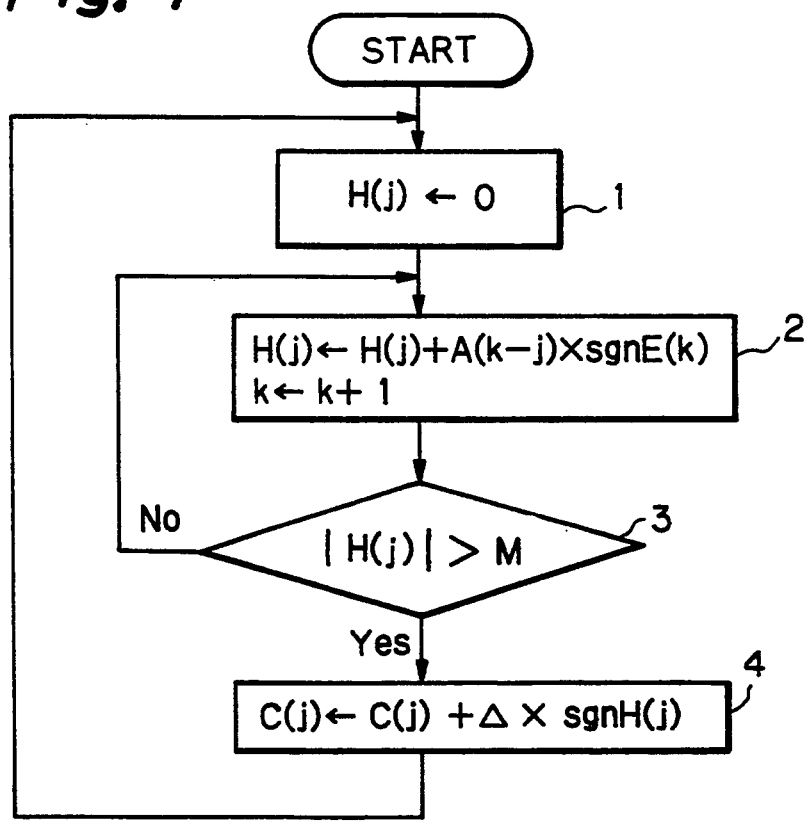
FIG. 7 is a flow chart for explaining an embodiment of the invention.
FIG. 10 is a schematic view showing variation of parameters in the embodiment of the invention.

A flow chart of the processing by an embodiment of the invention is shown in FIG. 7. The first step 1 clears the estimation value H(j) to zero. In the next step 2, a newly obtained estimation value is added to the estimation value H(j) of the equalization error E(k) already obtained. After this, k is incremented by +1. In the step 3 for decision, the absolute value of the calculated estimation value H(j) is compared with the converging coefficient M. If the absolute value is smaller than the converging coefficient M, the processing by step 2 and step 3 is repeated. Therefore, estimation values of equalization errors are accumulated. When the absolute value of the estimation value becomes larger than M, the corresponding parameter C(j) is increased or decreased by the fixed width of Δ in accordance with the polarity of the estimation value H(j) (step 4). Then the control returns to step 1 (step for clearing H(j)).

In this fashion, at least M occurrences of addition are performed. After sufficient convergence, it takes a long time for the estimation value H(j) to reach the converging coefficient M. As a result, significant occurrences of addition are executed. That is, although the step Δ is constant, the number of occurrences of addition N varies with amount of equalization errors. In addition, in case of increasing or decreasing the parameter with respect to quantized data as in this embodiment, a minimum step is determined by restriction of the bit length. However, in the method of increasing or decreasing the parameter in view of the absolute value of H(j), since the parameter maintains a value nearer to an optimal value for a long time after sufficient convergence, it has the merit that substantial resolution is smaller than Δ. The parameter automatic adjusting method according to the invention may be called a variable interval method.

Figure 8:
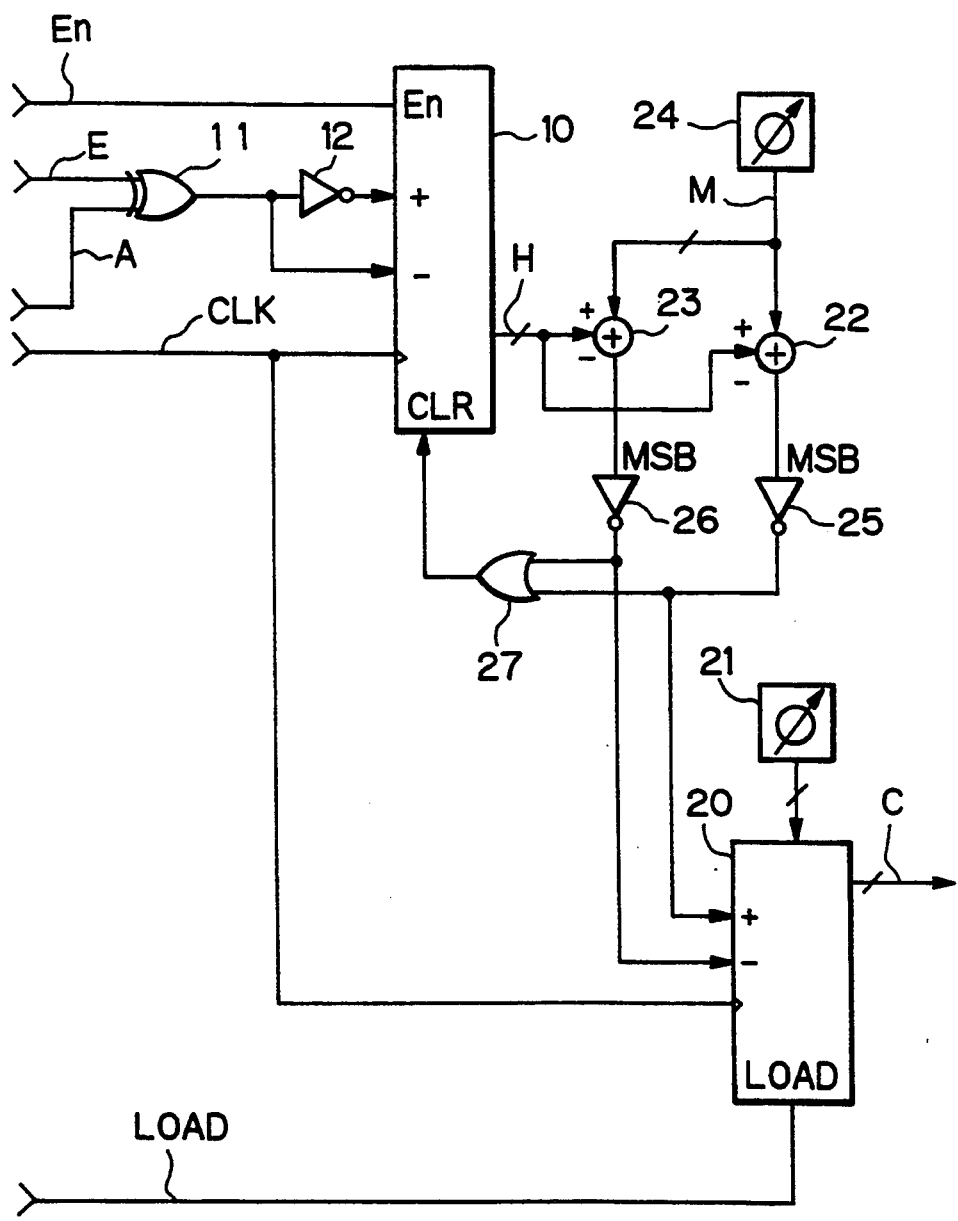
FIG. 8 is a block diagram of the embodiment of the invention.

FIG. 8 shows a circuit arrangement for realizing the method of FIG. 7. The circuit includes two up/down counters 10 and 20. The counter 10 is used for obtaining an equalization error estimating function H. Its counting is controlled by an enable signal En, and it is cleared by entry of a clear signal CLR. A sign E of an equalization error and an identification result A from an automatic equalizer (it may be either an identifier of the integral detecting scheme or an identifier of the adaptive threshold value detecting scheme) are supplied to an exclusive OR (X-OR) gate 11. If these bits supplied to the X-OR gate 11 are equal, output of an inverter 12 represents the high level and permits the counter 10 to increment the counting. In contrast, if the input bits of the X-OR gate 11 are different, output of the X-OR gate 11 becomes the high level and permits the counter 10 to decrement the counting.

Output H of the counter 10 is supplied to an adder circuit 22 and a subtractor circuit 23, respectively. These circuits are fed with the converging coefficient M set by a switch 24. An MSB indicative of the polarity of the output from the adder circuit 22 and an MSB indicative of the polarity of the output from the subtractor circuit 23 are supplied to inverters 25 and 26, respectively. Outputs from the inverters 25 and 26 are used as signals for controlling the counting direction of the counter 20. The outputs from the inverters 25 and 26 are supplied also to an OR gate 27, and output from the OR gate 27 is supplied to the clear terminal of the counter 10.

The counter 20 sets the parameter C. After a preset value set by the switch 21 is read by a load signal, when the estimation value H or −H generated by the counter 10 becomes larger then the converging coefficient M set by the switch 24, the counter 20 increments or decrements the parameter C by one step in accordance with the sign (MSB) of the estimation value H. That is, if $E \times (2 \times A - 1) > 0$, H is incremented by 1. If it is negative, H is decremented by 1.

Figure 4:
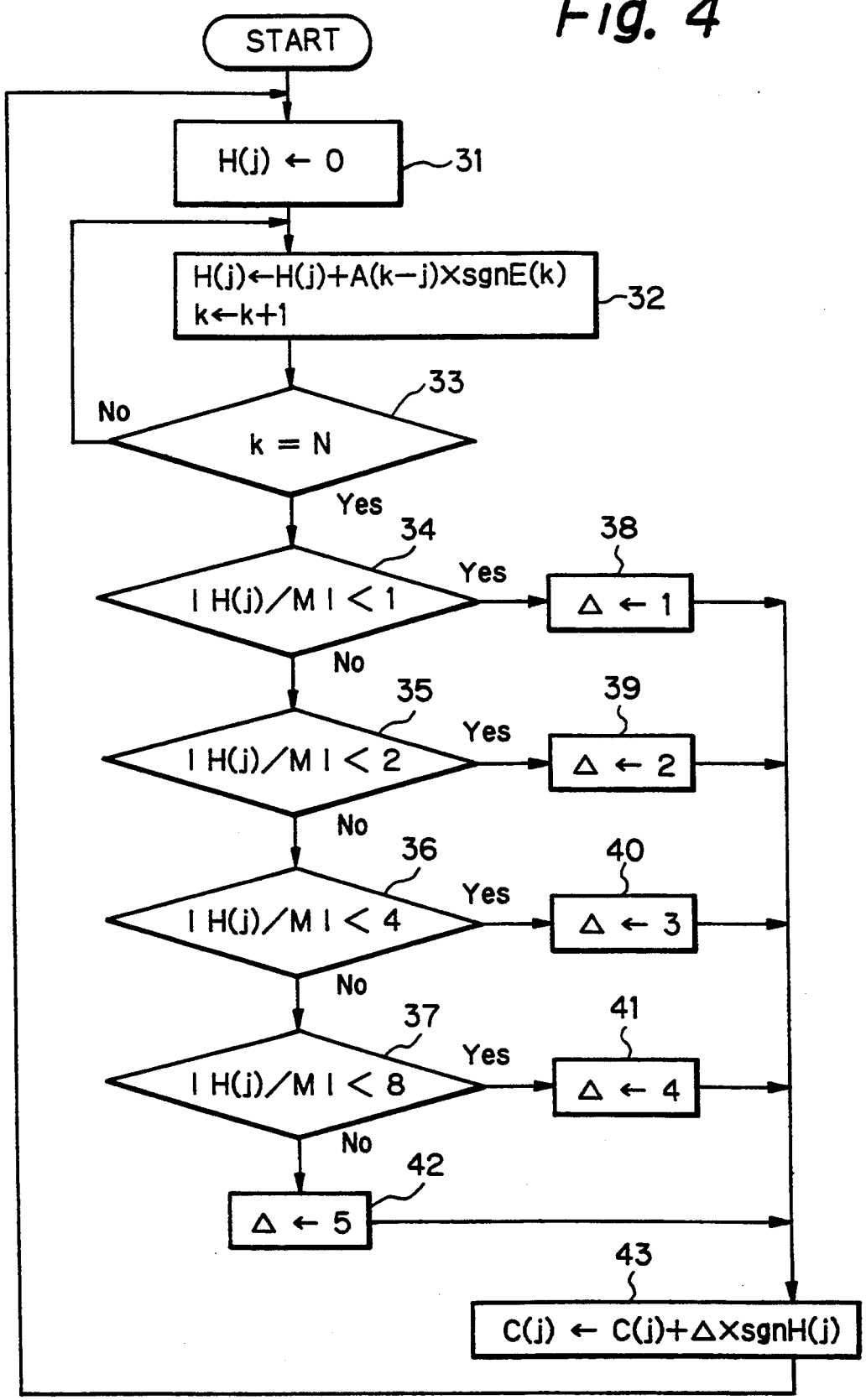
FIG. 4 is a flow chart showing processing by another example of the existing automatic equalization.

As compared to the existing variable step method, the circuit arrangement of FIG. 8 can omit an arrangement for varying the step of increasing or decreasing the parameter in view of the magnitude of the estimation value H. In addition, the present invention can omit also a counter for counting the number of occurrences of addition N. As a result, the circuit arrangement is simplified significantly. It is evident from comparison between the flow charts of FIGS. 7 and 4 that the process for discriminating the number of occurrences of addition and the process for varying the step Δ by discriminating the magnitude of an estimation value are not required.

Figure 1A:
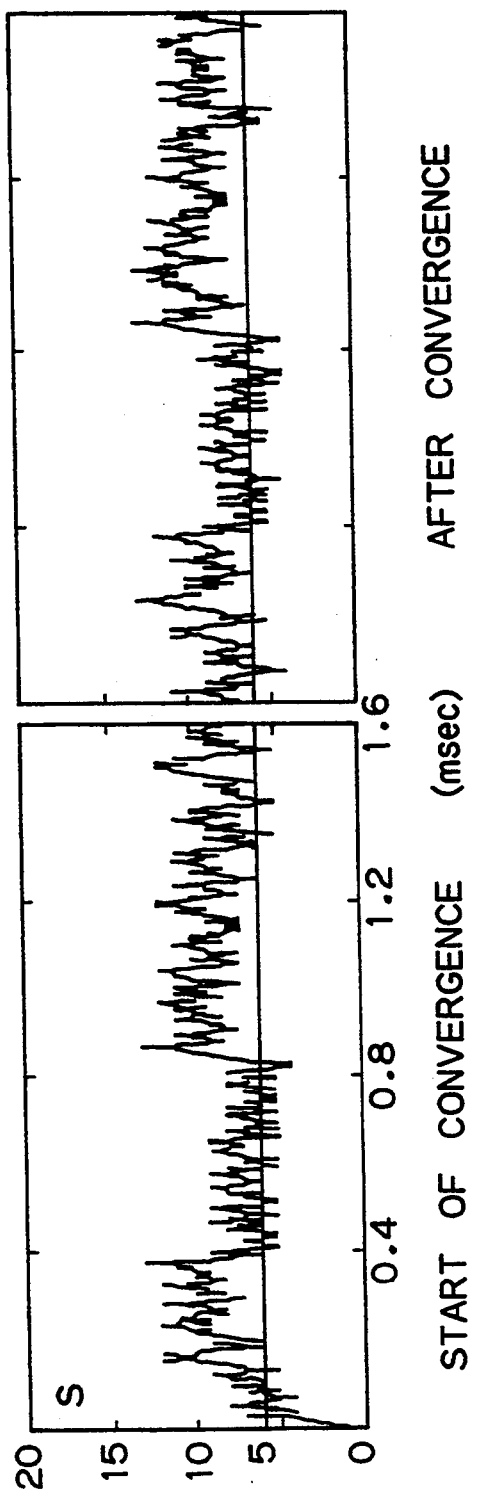
FIGS. 1A and 1B are schematic views showing converging characteristics of parameters by an existing automatic equalization.
Figure 1B:
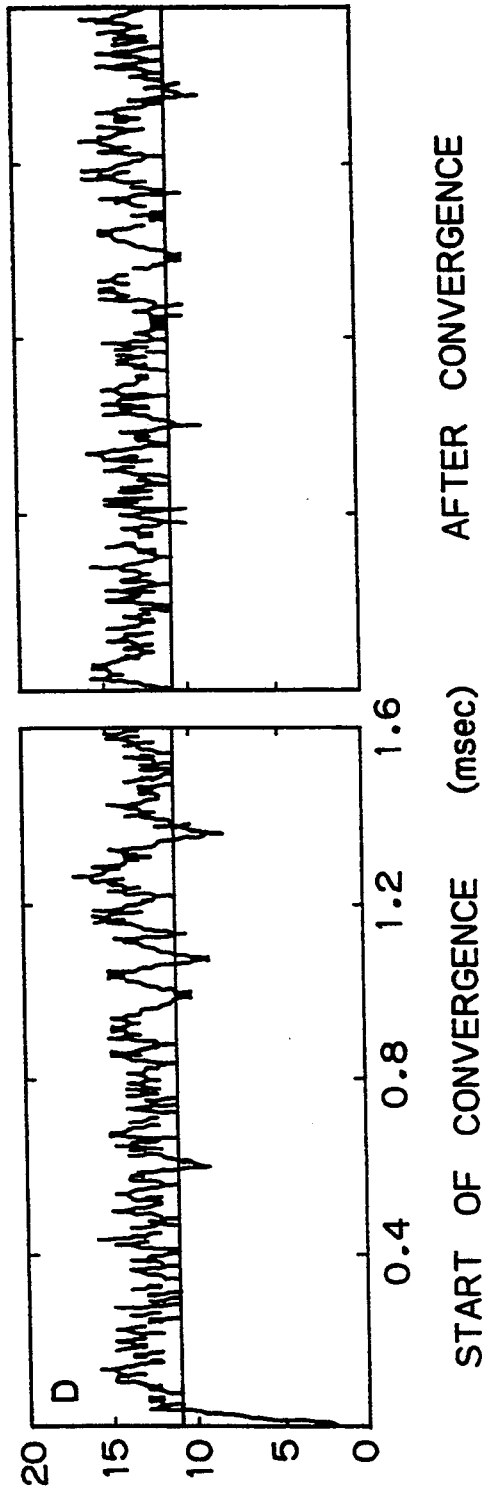
Figure 2A:
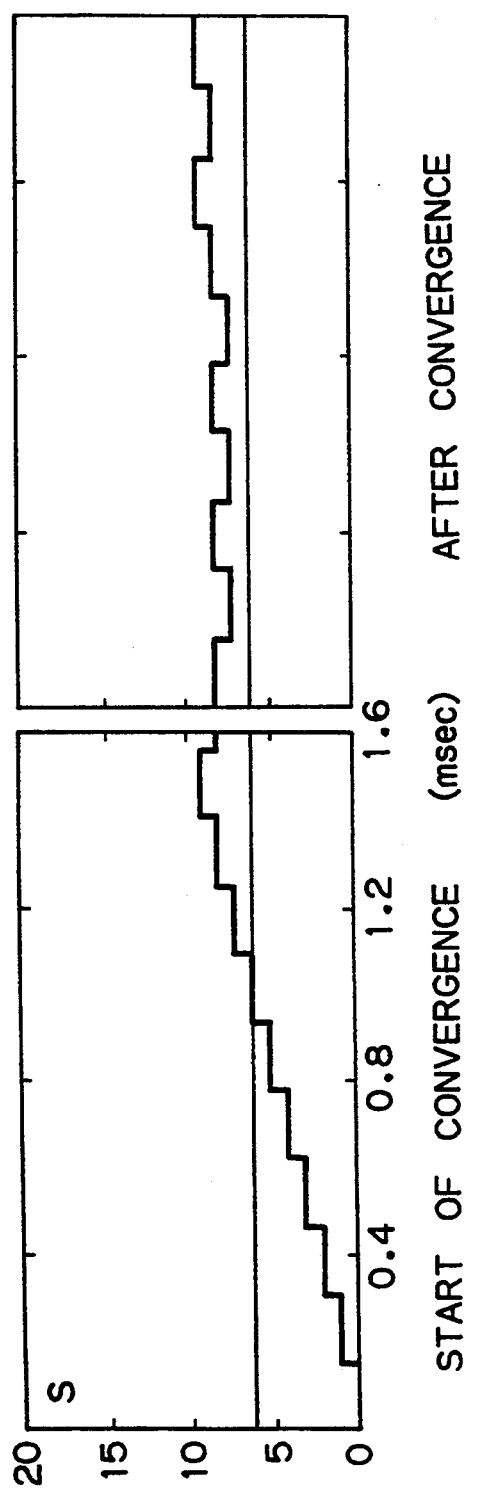
FIGS. 2A and 2B are schematic views showing converging characteristics of parameters by the existing automatic equalization.
Figure 2B:
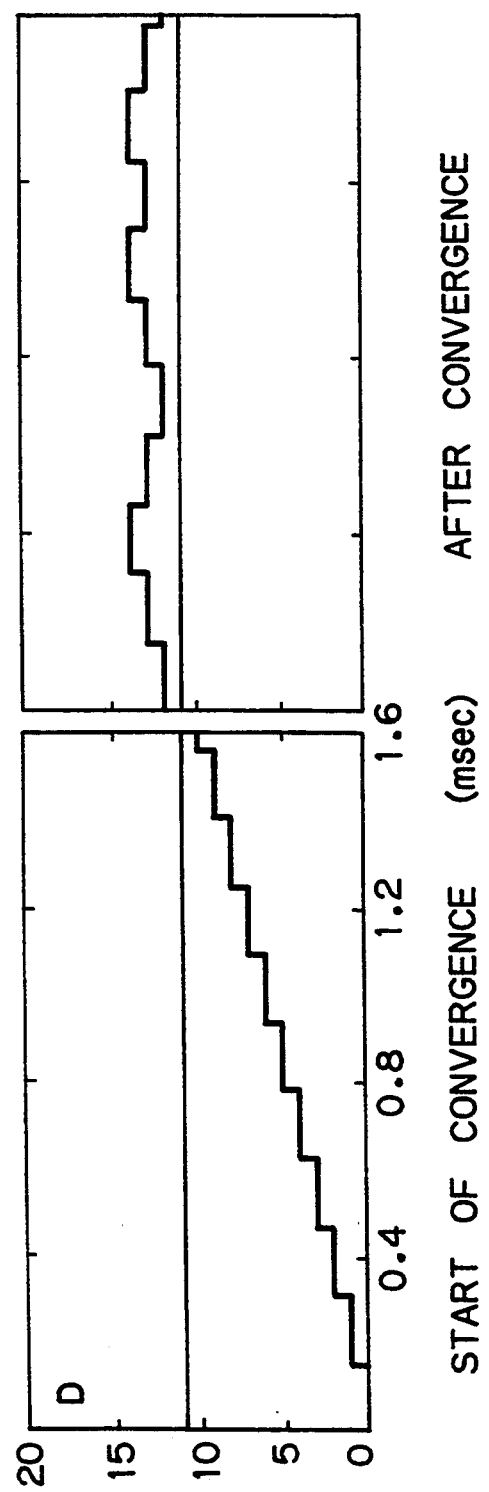
Figure 9A:
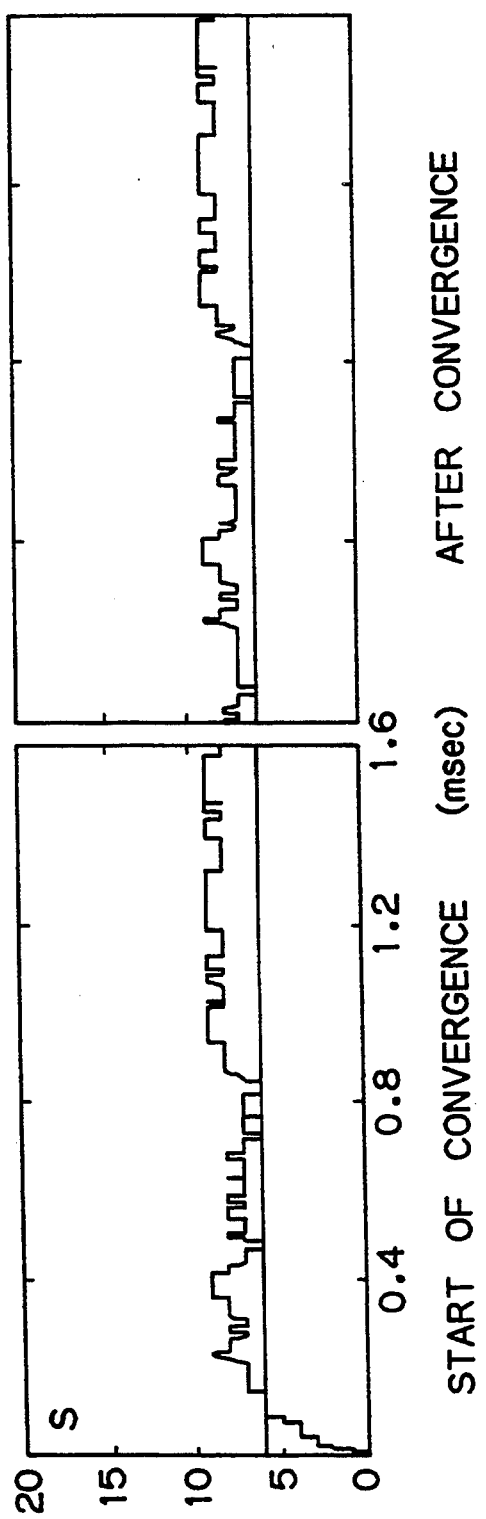
FIGS. 9A and 9B are schematic views showing convergence of parameters in the embodiment of the invention.
Figure 9B:
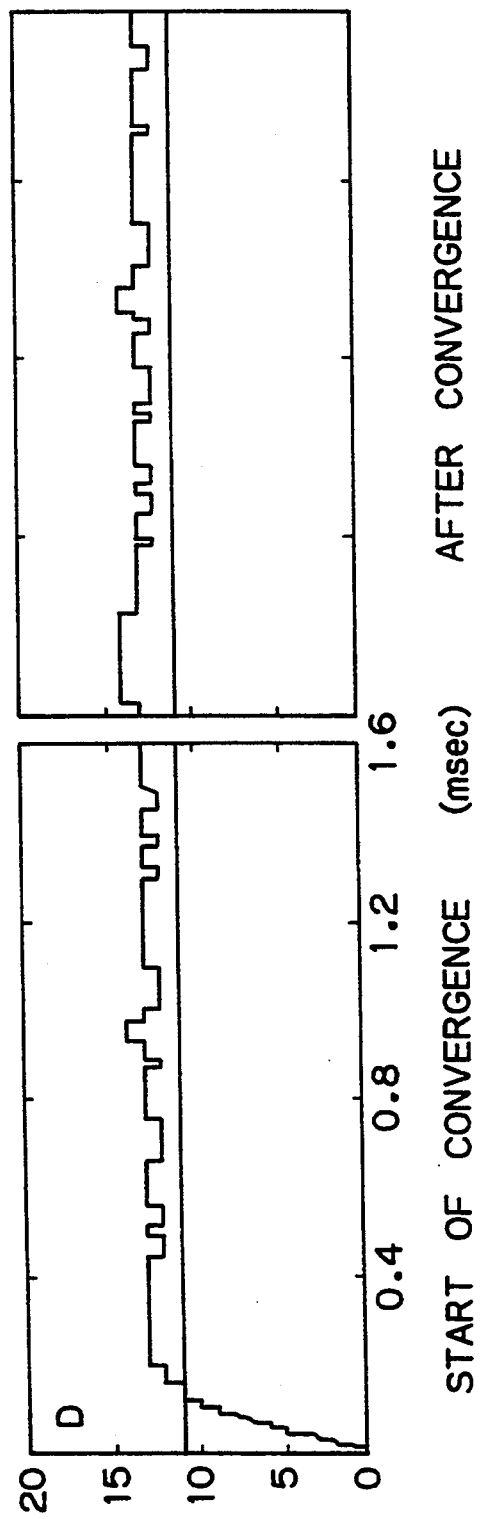

FIG. 9 shows an aspect of convergence of parameters in the variable interval method by the present invention. This simulation was also executed with the system of U.S. Pat. No. 5,313,472 instead of an automatic equalizer for comparing results of simulations. Results obtained by varying M from 4 to 512 are summarized in the table of FIG. 10. When FIG. 10 is compared with FIG. 5 showing convergence by the variable step method, it is noted that convergence is as fast as that of FIG. 5 and that variation after convergence is much smaller. As compared with FIGS. 1 and 2 in which Δ is fixed, convergence is as early as N=400 at the beginning, and values after convergence are as stable as N=6400. As to sign errors, simple comparison is not possible because parameters are of different kinds. Nevertheless, it is known from comparison between FIGS. 10 and 6 that the variable interval method according to the invention can decrease sign errors more.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

According to the invention, the following effects can be obtained when compared with the existing parameter automatic adjusting method:

1) A counter for counting the number of occurrences of addition N, and it is sufficient to set the converging coefficient M in response to the S/N.
2) Since it is sufficient to use circuits only for comparing the magnitudes of the absolute value of the estimation value and the converging coefficient M in the same number as that of the parameters, the circuit arrangement is much simplified.
3) Also when renewing parameters by operation based on A/D-converted data, since the period holding a parameter in a value near its optimum value is elongated, the invention gives the same results as increasing the number of bits.
4) Parameters are renewed in appropriate intervals for respective parameters.

Therefore, the invention can realize faster and more stable convergence of parameters with a simpler circuit arrangement than those of the existent method.

What is claimed is:

1. A method for automatically adjusting parameters of an automatic equalizer which equalizes a signal in accordance with said parameters, comprising the steps of:
   estimating a value of equalization error;
   modifying said estimated value of equalization error by a correction value so as to obtain a modified estimated value;
   comparing an absolute value of said modified estimated value with a predetermined convergent coefficient;
   repeating said step of modifying when said absolute value of said modified estimated value is smaller than said convergent coefficient; and
   varying one of said parameters of the automatic equalizer in accordance with a polarity of said modified estimated value when said absolute value of said modified estimated value is larger than said convergent coefficient.

2. The method of claim 1, wherein said correction value is determined in accordance with a polarity of an actual equalization error and a respective one of identification values identified on the basis of the equalized signal.

3. The method of claim 2, wherein said step of modifying modifies said estimated value by adding a product of said polarity of said equalization error and said respective one of said identification values to said estimated value.

4. The method of claim 1, further comprising resetting said estimated value to a predetermined level before said estimated value is initially modified by said correction value.

5. The method of claim 4, further comprising repeating said steps of resetting, modifying, comparing, repeating and varying for each one of said parameters of the automatic equalizer.

6. An apparatus for automatically adjusting parameters of an automatic equalizer which equalizes a signal in accordance with said parameters, the apparatus comprising:
   means for estimating a value of equalization error;
   means for continuously modifying the estimated value of equalization error by a correction value when an absolute value of the modified estimated value is smaller than a convergent coefficient; and
   means for varying one of said parameters of the automatic equalizer in accordance with a polarity of said modified estimated value when said absolute value of said modified estimated value is larger than said convergent coefficient.

7. The apparatus of claim 6, wherein said correction value is determined in accordance with a polarity of an actual equalization error and a respective one of identification values identified on the basis of the equalized signal.

8. The apparatus of claim 7, wherein said means for continuously modifying modifies said estimated value by adding a product of said polarity of said equalization error and said respective one of said identification values to said estimated value.

9. The apparatus of claim 6, further comprising means for resetting said estimated value to a predetermined level before said estimated value is initially modified by said means for continuously modifying.

10. The apparatus of claim 6, wherein the automatic equalizer which is to have its parameters adjusted is of the type which includes a transversal filter for equalizing the signal reproduced from a magnetic medium on the basis of a Nyquist standard.

11. The apparatus of claim 6, wherein said one parameter is renewed in a zero forcing focusing algorithm.

12. The apparatus of claim 6, wherein said means for continuously modifying comprises first means for determining a product of a polarity of an equalization error and a respective one of said identification values to produce a product output, means for incrementing said estimated value when the product output is a positive value and for decrementing said estimated value when the product output is a negative value to produce a modified estimated value, and second means for determining when said modified estimated value is greater than said convergent coefficient, and wherein said means for varying comprises means for adding a predetermined value to said one parameter when said second means for determining determines that said modified estimated value is greater than the convergent coefficient.

13. The apparatus of claim 12, wherein said means for continuously modifying further comprises means for resetting said estimated value when said second means for determining determines that said modified estimated value is greater than said convergent coefficient.

* * * * *